United States Patent

Benway

[11] Patent Number: 5,845,470
[45] Date of Patent: Dec. 8, 1998

[54] MOWER BLADE SPINDLE DEFLECTOR CUP

[75] Inventor: Randy Edward Benway, Horicon, Wis.

[73] Assignee: Deere & Company, Moline, Ill.

[21] Appl. No.: 865,286

[22] Filed: May 29, 1997

[51] Int. Cl.[6] .............................. A01D 34/03; A01D 34/18
[52] U.S. Cl. .......................... 56/17.5; 56/17.4; 56/320.1; 56/307; 403/23
[58] Field of Search ..................................... 56/17.4, 17.5, 56/320.1, DIG. 20, DIG. 24, 307, 12.1, 12.7, 255, 295; 403/23

[56] References Cited

U.S. PATENT DOCUMENTS

| | | | |
|---|---|---|---|
| 4,041,679 | 8/1977 | Seifert et al. | 56/11.3 |
| 4,989,398 | 2/1991 | Kuhn et al. | 56/17.5 |
| 5,117,617 | 6/1992 | Scag | 56/17.5 |

Primary Examiner—Thomas B. Will
Assistant Examiner—Arpad Fabian Kocacs

[57] ABSTRACT

A deflector cup coupled with a mower blade spindle for preventing material from accumulating around the spindle during operation, the deflector cup including a bottom wall having an opening within which the spindle is positioned, and a side wall extending upwardly from a radially outer edge of the bottom wall. A plurality of slots formed in the bottom wall extend radially outwardly from the opening and define finger portions between adjacent slots. The finger portions extend from the opening to the radially outer edge of the bottom wall and are of a size and shape strong enough to prevent the finger portions from deforming when the spindle is positioned within the opening. The finger portions and slots cause the side wall to deform elastically when the spindle is inserted into the opening.

20 Claims, 2 Drawing Sheets

MOWER BLADE SPINDLE DEFLECTOR CUP

This invention relates to deflector cups that are attached to a mower blade's spindle for preventing materials from wrapping around the spindle and spindle bearings.

It is known to provide mower blades which are fixed to spindles for rotation therewith. The spindles are driven by a power source such as an engine, and receive rotational power from the engine via a mechanism such as a belt and pulley arrangement. The spindles are typically supported by a pair of bearings mounted within a spindle housing. As the mower blade cuts vegetation, the clippings become airborne and travel near the spindle within the cutting chamber. Long clippings and other stringy materials can sometimes be flung into contact with the spindle by the rotating mower blade. Sometimes these longer clippings and stringy material can tend to wrap themselves around the rotating spindle, and can thereby bind up the spindle and bearings, making it difficult for the spindle to rotate. If enough material wraps itself around the spindle above the blade in this manner or otherwise becomes wedged between the spindle, bearings and spindle housing, the spindle may be hindered from rotating due to interference from the accumulated material. The operator may then be required to stop mowing operations and manually remove the accumulated material from the spindle.

In an attempt to prevent such materials from wrapping or otherwise accumulating around the spindle during mowing operations, deflector cups have been mounted to the spindle directly above the mower blade. Conventional deflector cups often include bottom walls that abut the top surface of the blade, and a generally cylindrically shaped side wall portion that extends upwardly from the bottom wall. The conventional deflector cup is held in place by the blade pressing upwardly against the deflector cup. Friction between the cup and top surface of the blade causes the cup to rotate with the spindle and blade. As long clippings and other stringy material such as weed stems are propelled toward the spindle during mowing operation, the materials will contact the side wall portion of the deflector cup and will thereby be blocked from contacting the spindle and bearings. If the materials do wrap or accumulate around the deflector cup they will not interfere with the rotation of the spindle. Therefore, continuous operation is facilitated due to the deflector cup blocking or shielding the spindle and bearings from the materials that may be airborne within the mower's cutting chamber.

One type of prior art deflector cup 2 is shown in FIG. 1, and provides an opening 4 in the bottom wall 6 of the cup 2 within which the spindle is positioned. A pair of short tabs 8, as shown in FIG. 1, are designed to engage the outer diameter of the spindle. The tabs 8 deform at least slightly as the cup 2 is assembled onto the spindle, and this deformation of the tabs 8 is intended to establish a tight fit between the spindle and the deflector cup 2. This deformation of the tabs 8 causes the tabs 8 to fit tightly against many different spindles that may have outer diameters of slightly different size due to low tolerance manufacturing processes used to fabricate the spindles. The deformation of the tabs 8 is intended to act as a spring which continues to press the tabs 8 against the spindle such that the cup 2 is held in position on the spindle even when the blade is removed from the spindle for maintenance. However, the tabs 8 are relatively small, and can permanently deform when assembled to the spindle. This permanent or plastic deformation of the tabs 8 as the spindle is inserted into the opening prevents the tabs 8 from continuously pressing against the spindle, and therefore the tabs 8 may not continue to hold the cup 2 in position against the spindle. When the blade is removed, the deflector cups 2 may then fall off of the spindles. Operators may misplace these deflector cups 2 or fail to place them back onto the spindles before re-attaching the blade to the spindle after the maintenance is completed. The mower will then lack protection against long clippings and materials which accumulate around the spindle.

It would therefore be desirable to provide a mechanism which includes a deflector cup that prevents materials from wrapping or otherwise accumulating around the spindle and interfering with rotation of the spindle. It would be desirable for such a deflector cup to remain fixed with the spindle even after the mower blade has been removed from the spindle. It would be desirable for such a mechanism to be simple in construction and comprised of few parts such that assembly and manufacturing costs are minimized. It would also be desirable for such a mechanism to be adapted for use with existing spindles such that changes to the spindle designs are not required. It would be desirable for such a mechanism to be adapted to fit on spindles having slightly different sizes due to relatively low tolerance manufacturing processes.

SUMMARY OF THE INVENTION

The preferred embodiment of the present invention provides a deflector cup coupled with a mower blade spindle for preventing material from accumulating around the spindle during operation. The deflector cup includes a bottom wall having an opening within which the spindle is positioned, and a side wall extending upwardly from a radially outer edge of the bottom wall. A plurality of slots formed in the bottom wall extend radially outwardly from the opening and define finger portions between adjacent slots. The finger portions extend from the opening to the radially outer edge of the bottom wall and are of a size and shape strong enough to prevent the finger portions from deforming when the spindle is positioned within the opening. The finger portions and slots cause the side wall to deform elastically when the spindle is inserted into the opening. The generally cylindrically shaped side wall is well suited to store energy by deforming elastically and will continuously bias the finger portions to engage the outer diameter of the spindle. The deflector cup according to the preferred embodiment thereby maintains the tight fit of the opening around the outer diameter of the spindle. The present invention prevents materials from wrapping or otherwise accumulating around the spindle and interfering with rotation of the spindle and remains fixed with the spindle even after the mower blade has been removed from the spindle. The deflector cup according to the present invention is simple in construction and comprised of few parts such that assembly and manufacturing costs are minimized. The present invention is adapted for use with existing spindles such that changes to the spindle designs are not required. Also, the deflector cup according to the present invention is adapted to flex to fit on spindles having slightly different sizes due to relatively low tolerance manufacturing processes.

DETAILED DESCRIPTION OF THE PREFERRED EMBODIMENT

Figure 2:
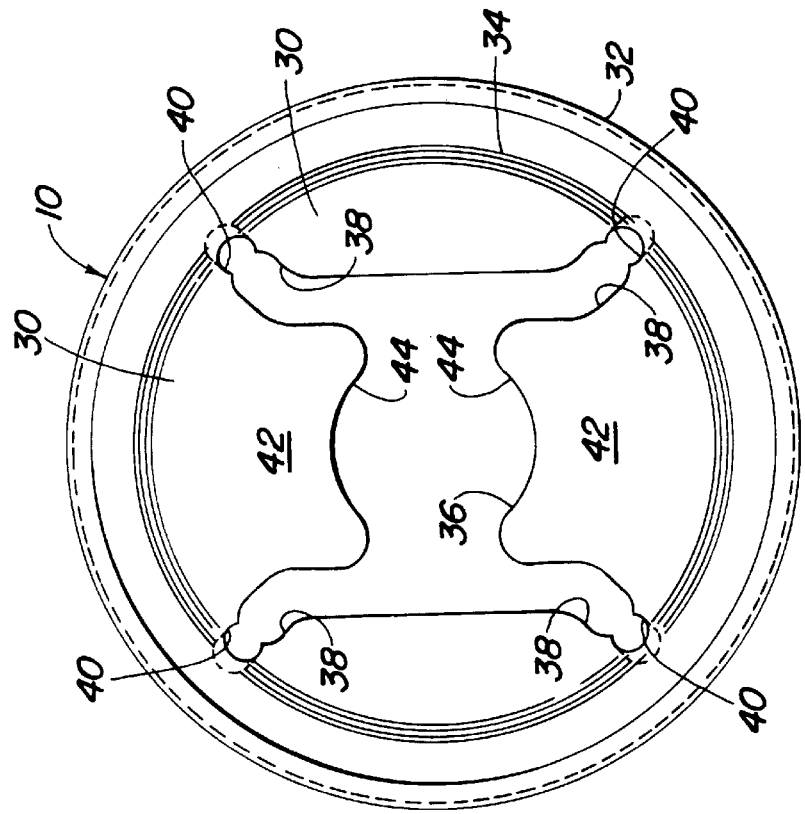
FIG. 2 is a top view of the deflector cup according to the present invention.
Figure 1:
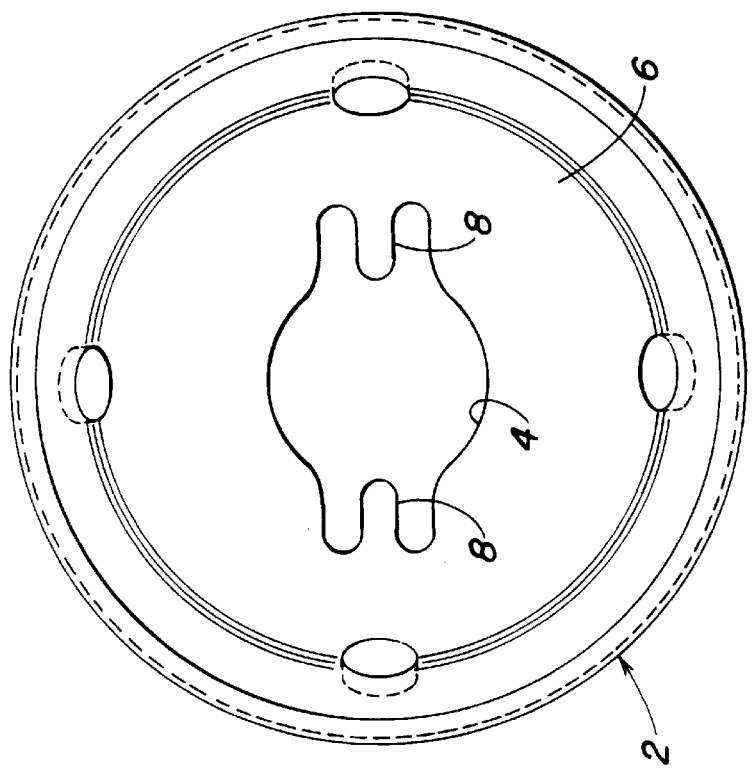
FIG. 1 is a top view of a prior art deflector cup.
Figure 3:
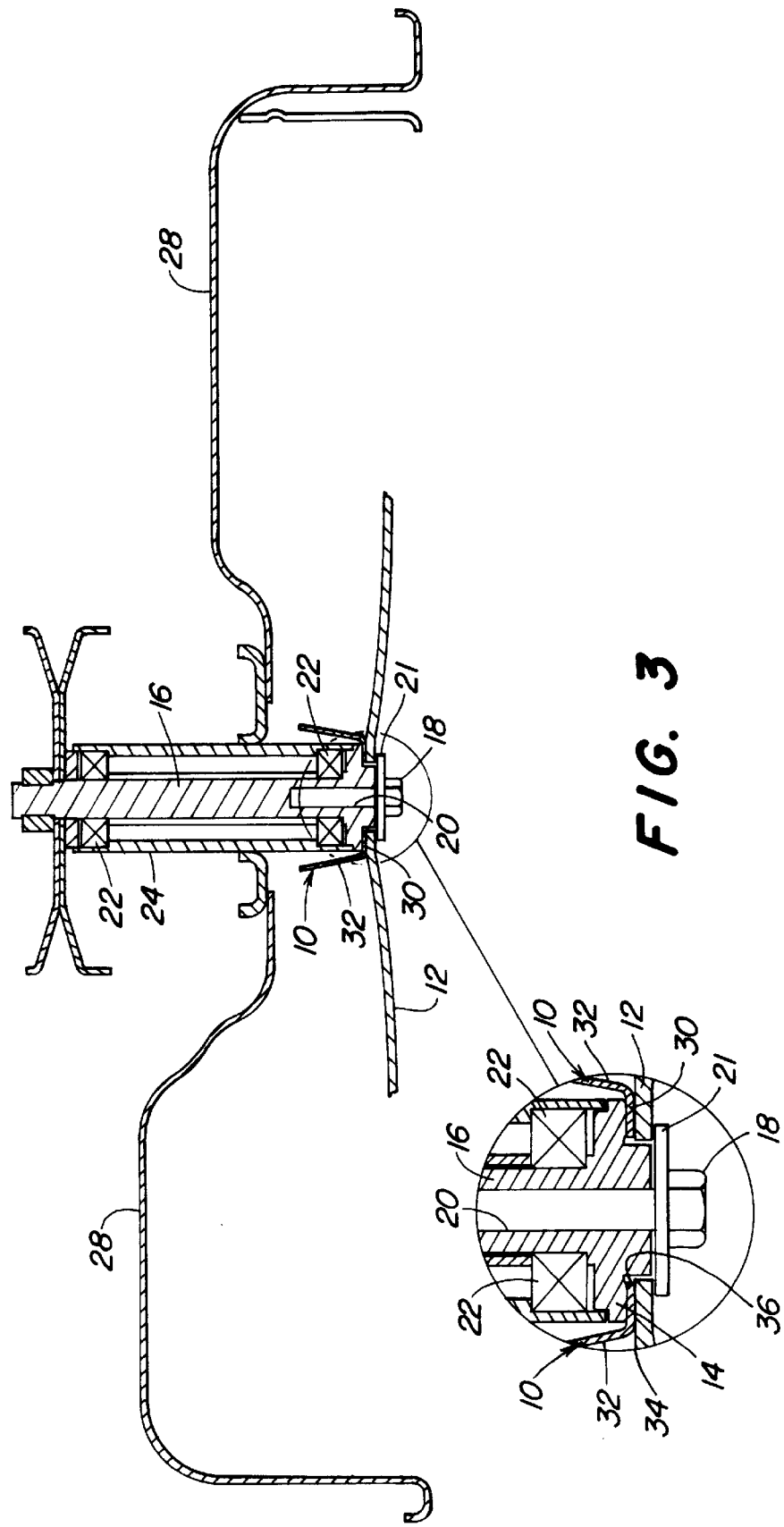
FIG. 3 is a sectional side view of the deflector cup in its assembled position on a mower spindle.

Referring now to FIGS. 2 and 3, there is shown the preferred embodiment of the present invention. A deflector cup 10 is provided which during operation is positioned between a mower blade 12 and a shoulder portion 14 of a spindle 16. A bolt member 18 is received within a threaded opening 20 in the bottom of the spindle 16, and operatively presses a washer 21 upwardly against the blade 12. The bolt member 18 and washer 21 operatively press upwardly against the blade 12, which presses upwardly against the deflector cup 10, which in turn is pressed upwardly against the shoulder portion 14 of the spindle 16. The friction between the bolt member 18, washer 21, blade 12, deflector cup 10, and shoulder portion 14 helps fix these parts together so that they rotate together during mowing operations. The spindle 16 is rotatably received by a pair of bearings 22 which are supported within a spindle housing 24. The spindle housing 24 is fixed to a mower deck 28 that defines a cutting chamber within which the blade 12 rotates for cutting grass and vegetation.

The deflector cup 10 includes a bottom wall 30 and a side wall 32 that extends upwardly from radially outer edges 34 of the bottom wall 30. The side wall 32 generally shields the spindle 16, spindle housing 24 and bearings 22 from clippings and other stringy material that would otherwise wrap around the spindle 16 or accumulate in that area. An opening 36 is formed in the bottom wall 30 for receiving the spindle 16. Four slots 38 are formed in the bottom wall 30 and extend radially outwardly. The slots 38 extend all the way to the outer edges 34 of the bottom wall 30. The slots 38 open into respective drain holes 40 which are located at the lower portion of the side wall 32. Any fluids that may accumulate within the deflector cup 10 are allowed to flow out of the deflector cup 10 through the drain holes 40, and rusting or deterioration of the deflector cup 10, spindle 16 and other parts is thereby hindered. Finger members 42 are defined by the material of the bottom wall 30 between adjacent slots 38. Curved edge portions 44 are defined by the innermost edges of the finger members 42. The curved edges 44 define the opening 36 within which the spindle 16 is positioned during mowing operation.

When the deflector cup 10 is assembled onto the spindle 16, the curved edge portions 44 of the finger members 42 engage the outer diameter of the spindle 16. The opening 36 in the bottom wall 30 defined by the curved edges 44 is slightly smaller than the outer diameter of the spindle 16, and therefore the cup 10 will deform slightly as the spindle 16 is forced into the opening 36 during assembly. The finger members 42 are comprised of an appropriate amount of material and are a size and shape that will prevent the finger member 42 itself from deforming during the assembly process. The side wall 32 will deform or flex slightly as the spindle 16 is inserted into the opening 36, and this deformation or flexing of the side wall 32 causes the finger members 42 to shift slightly from their pre-assembly positions to thereby increase the size of the opening 36 to accommodate the spindle 16. The side wall 32 deforms slightly, allowing the fingers 42 to shift slightly, which provides clearance for the spindle 16 as the spindle 16 is forced into the opening 36. Therefore, the finger members 42 do not themselves deform, but rather the side walls 32 deform or flex to provide the clearance necessary for the spindle 16 to enter the opening 36. The fingers 42 merely shift slightly as the side wall 32 flexes, thereby expanding the size of the opening 36 as the spindle 16 is forced into the opening 36 during the assembly process. The existence of the slots 38, which extend radially outwardly from the opening 36 to the side wall 32 according to the preferred embodiment, as well as the size and shape of the finger members 42, help cause the side wall 32 to flex as opposed to the bottom wall 30.

The side wall 32 is generally cylindrical in shape, and is well suited to flex elastically and thereby store energy much like a spring. This spring-like effect provided by elastic flexing of the side wall 32 continuously biases the curved edge portions 44 of the finger members 42 against the spindle 16. The deflector cup 10 is thereby held in position even when the blade 12 is removed from the spindle 16. The generally cylindrical shape of the side wall 32 is generally better suited to store energy by flexing elastically than the flat surface of the bottom wall 30. The generally cylindrical shape of the side wall 32 can generally store more energy by flexing than can the flat surface of the bottom wall 30 without deforming plastically or permanently. Therefore, the side wall 32 is well adapted to bias portions of the deflector cup 10 against the spindle 16 without undergoing plastic deformation. The deflector cup 10 according to the preferred embodiment is therefore well adapted to hold itself against the spindle 16 even when the blade 12 is removed.

I claim:

1. A deflector cup adapted for being positioned on a spindle to which a mower blade is fixed for rotation for cutting vegetation, said deflector cup comprising:

a bottom wall and a side wall extending upwardly from said bottom wall, an opening in the bottom wall within which the spindle is received, said opening being slightly smaller than the spindle such that the spindle fits tightly within the opening, at least one slot formed in the bottom wall, said at least one slot extending from the opening to a position proximate the side wall, said at least one slot being adapted to cause the side wall to deflect elastically when the spindle is positioned within the opening for maintaining the tight fit of the opening against the spindle.

2. The invention of claim 1, wherein said bottom wall includes curved edge portions which define the opening and engage the spindle.

3. The invention of claim 1, wherein said at least one slot extends radially outwardly from the opening and includes an end portion that extends into the side wall.

4. The invention of claim 1, wherein four slots are provided which extend radially outwardly from the opening to positions proximate the side wall for causing the side wall to deflect elastically when the spindle is positioned within the opening.

5. The invention of claim 4, wherein said four slots are spaced approximately ninety degrees about the opening.

6. The invention of claim 4, wherein at least two fingers are defined in the bottom wall between adjacent slots, said fingers engage the spindle, and said fingers and slots cause the side wall to deflect elastically when the spindle is positioned within the opening.

7. The invention of claim 6, wherein said fingers further comprise curved edge portions which define the opening and engage the spindle.

8. The invention of claim 7, wherein said fingers are a size and shape that generally prevents said fingers from deforming plastically due to the presence of the spindle within the opening.

9. The invention of claim 2, wherein four slots are provided which extend radially outwardly from the opening to positions proximate the side wall for causing the side wall to deflect elastically when the spindle is positioned within the opening.

10. The invention of claim 9, wherein said four slots are spaced approximately ninety degrees about the opening.

11. The invention of claim 10, wherein at least two fingers are defined in the bottom wall between adjacent slots, said fingers engage the spindle, and said fingers and slots cause the side wall to deflect elastically when the spindle is positioned within the opening.

12. The invention of claim 11, wherein said fingers further comprise curved edge portions which define the opening and engage the spindle.

13. The invention of claim 12, wherein said fingers are a size and shape that generally prevents said fingers from deforming plastically due to the presence of the spindle within the opening.

14. A deflector cup adapted for being coupled with a mower blade spindle for preventing materials from accumulating around the spindle during operation, said deflector cup comprising:

a bottom wall having an opening within which the spindle is positioned, a side wall coupled with a radially outer edge of the bottom wall, said bottom wall further comprising at least two slots which extend radially outwardly from said opening, and at least one finger portion positioned between two of said slots, said finger portion extends from the opening to the radially outer edge of the bottom wall, said finger portion having a size and shape that is strong enough to prevent the finger portion from deforming when the spindle is positioned within the opening, and said finger portion and slots cause the side wall to deform elastically when the spindle is inserted into the opening.

15. The invention of claim 14, wherein said finger portion includes a curved edge portion which engages the spindle.

16. The invention of claim 14, wherein four slots are defined in the bottom wall, and a pair of fingers are defined between respective slots.

17. The invention of claim 14, wherein said slots extend radially outwardly from said opening and include outer end portions which extend to the outer edge portion of the bottom wall.

18. The invention of claim 16, wherein said finger portion includes a curved edge portion which engages the spindle.

19. The invention of claim 16, wherein said slots extend radially outwardly from said opening and include outer end portions which extend to the outer edge portion of the bottom wall.

20. The invention of claim 19, wherein said finger portion includes a curved edge portion which engages the spindle.

* * * * *